United States Patent [19]

Lawwill

[11] Patent Number: 5,299,820
[45] Date of Patent: Apr. 5, 1994

[54] BICYCLE FRONT SUSPENSION

[76] Inventor: Mert Lawwill, 148 Rockhill Dr., Tiburon, Calif. 94929

[21] Appl. No.: 762,600

[22] Filed: Sep. 19, 1991

[51] Int. Cl.[5] .............................................. B62K 3/00
[52] U.S. Cl. .................................... 280/277; 280/279
[58] Field of Search ................. 280/277, 276, 275, 279

[56] References Cited

U.S. PATENT DOCUMENTS

| | | | |
|---|---|---|---|
| 1,096,417 | 11/1913 | Ekstrom | 280/277 |
| 2,660,455 | 11/1953 | Douglas et al. | 280/277 |
| 3,954,284 | 5/1976 | Phillips et al. | 280/277 |

FOREIGN PATENT DOCUMENTS

| | | | |
|---|---|---|---|
| 0063758 | 11/1912 | Switzerland | 280/277 |
| 0017291 | of 1905 | United Kingdom | 280/277 |
| 0026763 | of 1910 | United Kingdom | 280/277 |

*Primary Examiner*—Margaret A. Focarino
*Assistant Examiner*—Florian Zeender
*Attorney, Agent, or Firm*—James E. Eakin

[57] ABSTRACT

A front suspension for a bicycle includes lower swing arms, upper swing arms and hub plates connected to the front forks in a substantially rhomboidal arrangement, and communicating with a shock absorber through a stabilizer tube, wherein the geometries of the trapezoid are balanced to provide substantially the same trail through the travel of the suspension.

7 Claims, 2 Drawing Sheets

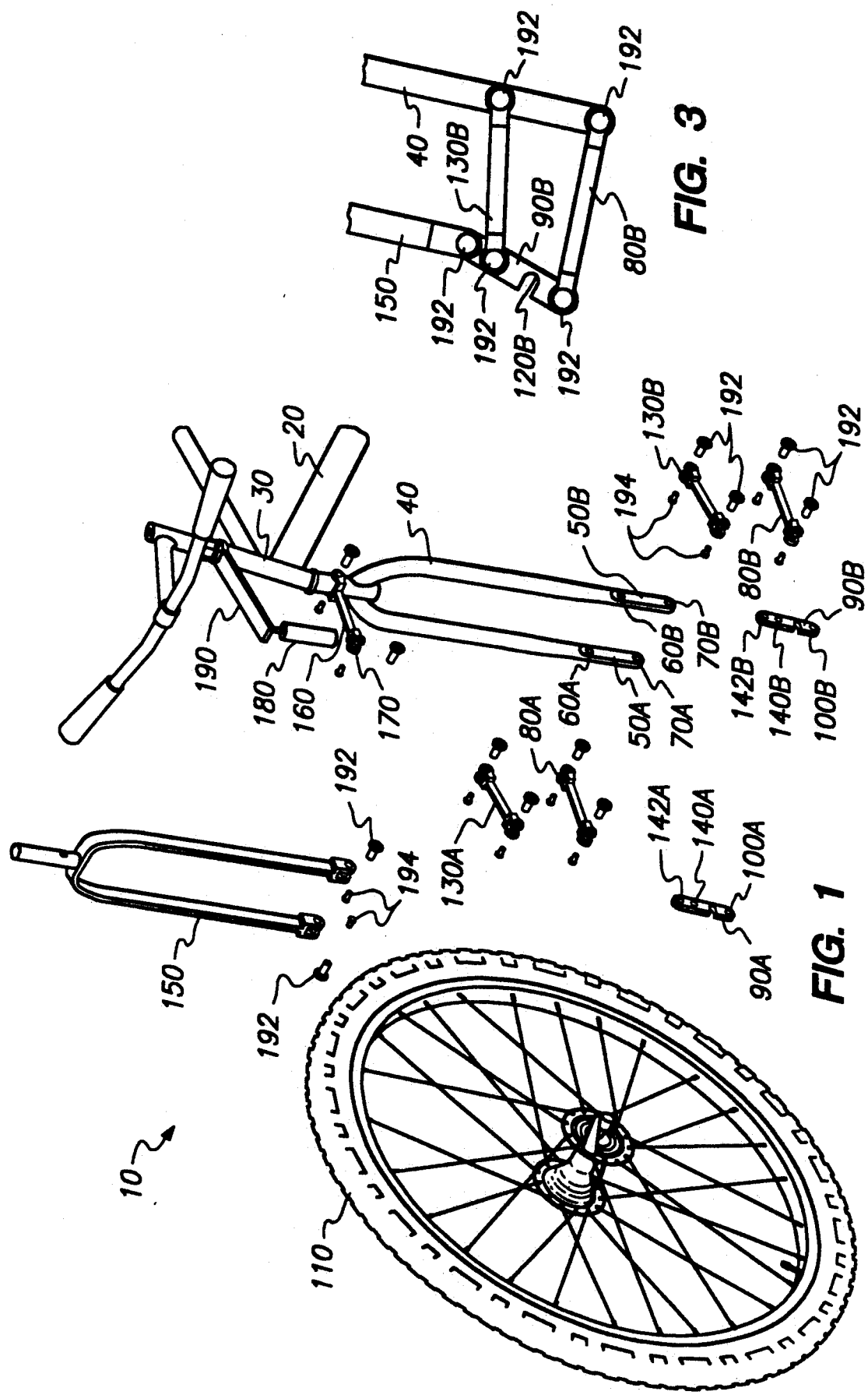

BICYCLE FRONT SUSPENSION

FIELD OF THE INVENTION

This present invention relates to bicycles, and more particularly relates to bicycles employing suspension means for at least the front wheel.

BACKGROUND OF THE INVENTION

Bicycles have long been used as a means of transportation and recreation. However, until recently, virtually all practical bicycles have involved a relatively rigid frame, which transmits directly to the rider shocks resulting from potholes, rocks or other unevenness in the riding surface. This has resulted in discomfort to the rider which is at the least undesirable, if not unacceptable.

Recently, various bicycles have been introduced which provide some rear suspension, particularly for use with mountain bikes. Mountain bikes, because they are designed for use on rough terrain, are particularly susceptible to problems resulting from encounters with boulders, ditches, ruts, rocks, gravel, and other debris. Bicycles which provide a rear suspension solve a significant portion of the problem, and provide a greatly worthwhile improvement over the conventional, rigid frame mountain bike.

However, there remains a need for a front suspension capable of absorbing shocks while at the same time providing continuous control so that the rider can properly maneuver the bicycle at all times. Two factors figure prominently in the maintenance of control by the rider. The first is stiction, which basically refers to how well the front portion of the frame can absorb shocks. Obviously, a conventional rigid frame has little ability to absorb shocks, and so the rider has to adjust or otherwise accommodate unevenness in the riding surface. The second factor is trail. Trail refers to the distance, measured at the ground, between the center point of the hub of the front wheel, projected perpendicularly onto the ground, and the projection of the center line of the head of the frame along the head angle onto the ground.

The typical solution to this problem found in the prior art has been to include a shock absorber substantially like those provided on motorcycles, although with slightly different damping materials. Such shock absorbers are typically of the telescoping type. One current example of such a product is sold under the trademark "Rock Shox". The difficulty with such designs is that, while they can absorb small shocks, they have limited travel and are more prone to loss of control than is desirable, particularly upon hitting a larger obstacle such as a curb.

Another limitation with prior designs for front suspensions is that trail varies significantly with the amount of travel of the shock. In motorcycles such variation is not necessarily significant to the rider. However, in bicycles, which are much lighter weight than motorcycles, even slight variations—on the order of one-eighth inch—in trail can be detected by experienced riders, and modest variations of as little as one-half inch can make very significant differences. As a result, there has been a need for a bicycle front suspension which provides shock absorption without material variation in trail.

There has therefore been a need for a front suspension for a bicycle which is capable of encountering relatively large obstacles and absorbing the impact caused thereby while at the same time permitting the rider readily to retain control of the bicycle.

SUMMARY OF THE INVENTION

The present invention provides a bicycle front fork suspension which resolves many, if not virtually all, of the limitations of the prior art. The present design includes a fork tube having pivot holes at the lower end thereof for connection to a pair of lower swing arms which in turn connect to a hub, or dropout, plate. The hub plate is also connected to a stabilizer tube which drives a shock absorber of a conventional type.

In operation, an impact to the front wheel drives the hub of the wheel upward, which in turn drives the hub plate, stabilizer tube and lower swing arms upward. The stabilizer tube compresses the shock absorber, and the effects of the impact on the rider are significantly reduced.

Importantly, the arrangement of the swing arms maintains the travel of the front wheel substantially along a constant trail distance throughout the range of travel of the front wheel. In this manner, the rider experiences substantially the same sense of control of the bicycle throughout the travel of the front suspension.

In tests, a bicycle having a prototype suspension according to the present invention can be ridden directly into and over a conventional curb with no loss of control or pitching forward of the bicycle.

It is therefore one object of the present invention to provide a front suspension for a bicycle which is capable of sustaining significant shocks without loss of control by the rider.

It is another object of the present invention to provide a simple but efficient front suspension for a bicycle which is extremely durable.

It is yet another object of the present invention to provide a front suspension for a bicycle which maintains substantially the same trail throughout the travel of the suspension.

These and other objects of the invention will be better understood from the following Detailed Description of the Invention, taken together with the attached Figures.

THE FIGURES

FIG. 1 is an exploded perspective view of the front suspension for a bicycle according to the present invention.

FIG. 3 is a detailed left side elevational view of the hub plate and upper swing arms according to the present invention.

DETAILED DESCRIPTION OF THE INVENTION

Figure 2:
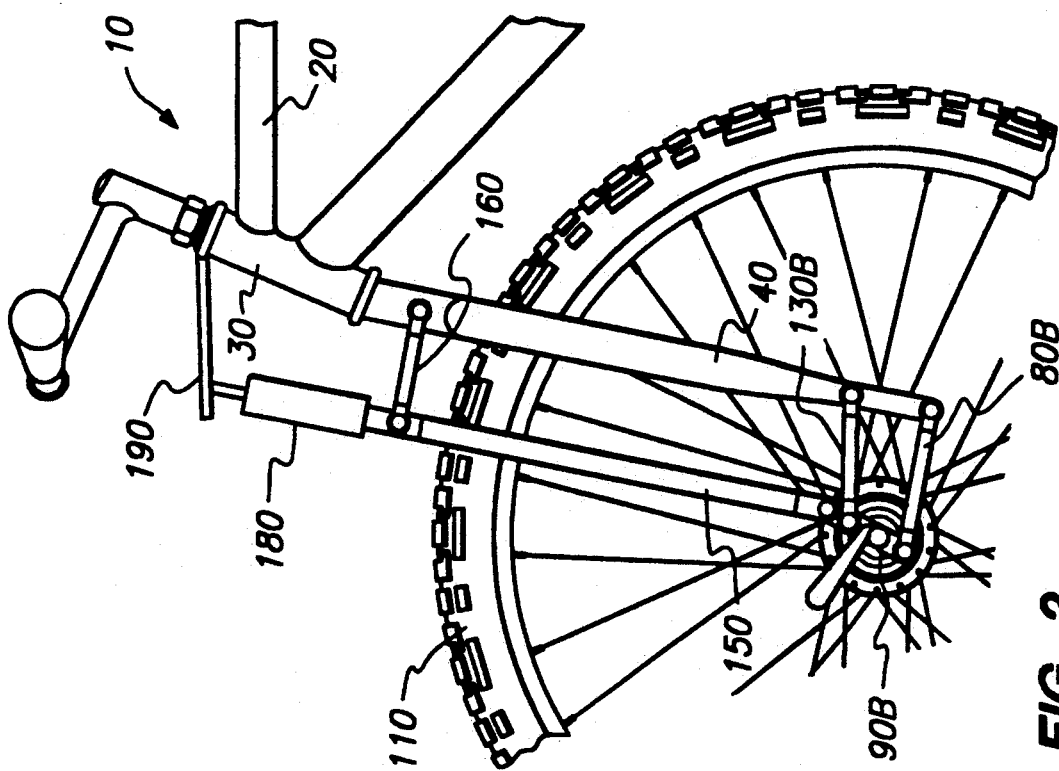
FIG. 2 is a left side elevational view of a front suspension for a bicycle according to the present invention.

Referring first to FIGS. 1 through 3, exploded left side perspective, elevational and detailed left side elevational views of a bicycle front suspension are shown. The bicycle 10 includes a frame 20 having a headset 30 integrally formed therewith, all in a conventional manner.

In accordance with the present invention, front forks 40 connects to the frame 20 at the head 30 thereof and is retained in position in a conventional manner with the angle therebetween typically about 10 degrees. The lower ends 50A and 50B of the front fork 40 include upper pivot holes 60A-B, respectively, and lower pivot holes 70A-B, respectively. Alternatively, flanges welded to the forks could be provided for the pivot holes.

Pivotably connected to the lower pivot holes 70A-B are the back portion of a pair of lower swing arms 80A-B. The front ends of the lower swing arms are pivotably connected to the lower end of a pair of hub plates 90A-B through a pair of holes 100A-B. A conventional wheel and tire 110 are connected to respective slots 120A-B in the hub plates in a conventional manner.

A pair of upper swing arms 130A-B are connected at the forward ends thereof to the hub plate 90 through a second pair of holes 140A-B, and connect at the rearward ends thereof to the upper pivot holes 60A-B on the front fork 40.

A stabilizer tube 150 also is connected to the hub plate through a top pair of holes 142A-B, and extends upward substantially parallel to the front forks 40. A stabilizer arm 160 includes a pair of pivot flanges 170 to which the stabilizer tube 150 is pivotably connected at its top. The stabilizer arm 160 is pivotably connected to the front forks 40, and prevents excess movement of the stabilizer tube 150 under stress. Also at its top, the stabilizer tube 150 pivotably connects to a shock absorber 180, which may be of the gas filled cylinder or polymeric shock absorber type. In a presently preferred embodiment, the shock absorber 180 is pivotably connected at its top to a bracket 190 extending forward from the headset 200 above the head 30. In this manner the bracket 190 and shock absorber 180 can rotate with the handlebars and forks of the bicycle. Alternatively, the shock absorber 180 can be connected to the forks 40 or the stem of the handlebars.

In all instances described herein, pivotable connections between the various arms and tubes may be made in any manner, but typically will be made using bushings 192 and retaining screws 194 threaded into the side of the bushings in a conventional manner.

During operation, an impact received by the front wheel 110 drives the hub of the wheel upward. This causes the hub plates 90A-B to drive upward, in turn causing the lower swing arms 80A-B to rotate about the pivot holes 70A-B on the front forks 40. Likewise, the somewhat shorter upper swing arms 130A-B rotate about the pivot point formed at the pivot holes 60A-B. The stabilizer tube 150 is driven upward, causing the stabilizer arm 170 to pivot upward as well. The connection at the top of the stabilizer tube 150 to the shaft of the shock absorber 180 and the stabilizer arm 170 limits the play in the junction between the stabilizer tube 150 and the shock absorber 180, causing the stabilizer tube to drive upward and compress the shock absorber.

Importantly, as the lower swing arms 80A-B rotate upwardly, the hub of the wheel moves slightly backward in an amount limited by the upper swing arms 130A-B. By adjustment of the relative lengths and pivot point positions of the upper swing arms, lower swing arms and hub plate, the hub of the wheel can be maintained at substantially the same trail throughout the range of travel of the suspension as when the suspension is at neutral.

In general, bicycle riders tend to prefer trail to be between 1.25 and 2.0 inches, and trail between 1.50 and 1.75 inches is optimal. In an exemplary embodiment best seen in FIG. 4, to achieve trail of approximately 1.5 inches which remains substantially constant throughout the travel of the suspension, the distance between pivot points of the upper swing arms 130A-B is 3.75 inches, the distance between pivot points of the lower swing arms 80A-B is 4.25 inches, the distance from lower holes 100A-B to the slots 120A-B is 0.875 inches, and the distance from the slots 120A-B to the holes 140A-B is one inch. The distance from the holes 140A-B to the top holes 142A-B is 0.75 inches. In such an embodiment, the distance from the second pivot holes 60 to the lower pivot holes 70 is 2.42 inches. In the event flanges are provided for the pivot holes 60 and 70, the length of the swing arms will need to be adjusted accordingly. It will be appreciated by those skilled in the art that the exemplary geometry provided here is by way of example only, and not by way of limitation. The dimensions provided in the foregoing example can readily be changed to provide substantially the same operation, and in some instances modifications may be desirable to provide a different amount of trail.

Because of the relative shortness of the upper and lower swing arms, and their location forward on the bicycle, the arrangement of FIGS. 1-4 provides very little stiction. This permits the bicycle suspension to absorb substantial shocks without serious risk of loss of control. A prototype bicycle has been shown to be capable of absorbing shocks such as those caused by riding directly into a curb without loss of control when ridden by an experienced rider.

Figure 4:
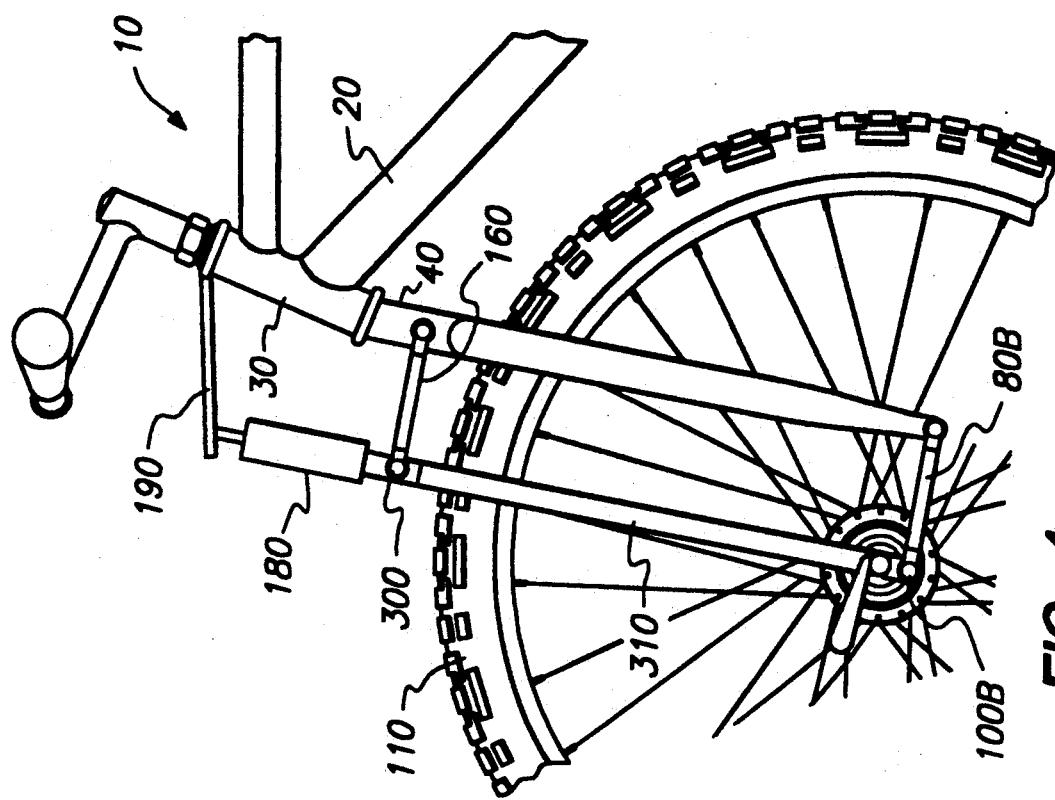
FIG. 4 is a left side elevational view of an alternative design for front suspension for a bicycle according to the present invention.

It is also possible to combine the upper swing arms with the stabilizer arm, and an alternative embodiment showing such a combination is shown in FIG. 4. In the embodiment of FIG. 4, like parts have been assigned the same reference numerals used in FIGS. 1 through 3. In such an arrangement, the stabilizer tube 310 is modified from the earlier stabilizer tube 150 of FIGS. 1-4 to integrally include the hub plates 90A-B of the embodiment of FIG. 1, thus making a rigid connection between the holes 100A-B and the hole 300. The stabilizer arm 160, which connects to the stabilizer tube 310 in the same pivotable manner as in FIG. 1, assumes the role of the upper swing arms 130A-B. In such an arrangement, the pivot to pivot distance on the lower swing arms 80A-B is about 4.30 inches in an exemplary embodiment designed for 1.5 inches of trail, while the pivot to pivot distance of the stabilizer arm is 2.5 inches in such an embodiment. Such an arrangement also provides the low stiction and consistent trail of the embodiment of FIGS. 1-3. If flanges are used, the pivot to pivot distance on the lower swing arms is on the order of 3.80 inches.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A front suspension for a bicycle having
a front wheel with a hub,
hub plate means wherein the hub of the front wheel is rotatably affixed to the hub plate at a wheel connecting point, the hub plate means additionally having upper and lower connecting points B1,
a fork rotatably connected to a bicycle frame, lower swing arm means having forward and rearward ends thereof, the forward ends thereof having a first connecting means and the rearward ends thereof having a second connecting means, the first connecting means being pivotably connected to the lower connecting points on the hub plate and the second connecting means being pivotably connected to the front fork, upper swing arm means having forward and rearward ends thereof, and shorter than the lower swing arm means, the forward ends thereof being pivotably connected to the upper connecting points on the hub plate means and the rearward ends thereof being pivotably connected to the front fork above the lower swing arm means, shock absorber means fixedly supported at an upper end thereof, and stabilizer tube means having upper and lower ends and pivotably connected to the hub plate means at the lower end and a lower end of the shock absorber means at the upper end.

2. A front fork assembly for a bicycle having a front fork adapted to be rotatably connected to the frame of a bicycle and having upper and lower connecting means, hub plate means adapted to receive a front wheel having a hub, wherein the hub of the front wheel is rotatably affixed to the hub plate, the hub plate means having upper and lower connecting points, lower swing arm means having forward and rearward ends thereof, the forward ends thereof having a first connecting means and the rearward ends thereof having a second connecting means, the first connecting means being pivotably connected to the lower connecting points on the hub plate means and the second connecting means being pivotably connected to the lower connecting means of the front fork, upper swing arm means having forward and rearward ends thereof, and shorter than the lower swing arm means, the forward ends thereof being pivotably connected to the upper connecting points on the hub plate means and the rearward ends thereof being pivotably connected to the upper connecting means of the front fork, shock absorber means having two ends and fixedly supported at one end thereof, and stabilizer tube means having upper and lower ends and pivotably connected to the hub plate means at the lower end and the other end of the shock absorber means at the upper end.

3. A front suspension for a bicycle having a front fork adapted to be connected to a bicycle frame and having upper and lower connecting means near a lower end thereof, hub plate means having wheel connection means for having a hub of a front wheel rotatably affixed thereto, the hub plate means having top and bottom connecting points with the top connecting points above the wheel connection means and the bottom connecting points below the wheel connection means, and the wheel connection means being positioned above the lower connecting means on the front fork, lower swing arm means having forward and rearward ends thereof, the forward ends thereof having a first connecting means and the rearward ends thereof having a second connecting means, the first connecting means being pivotably connected to the bottom connecting points on the hub plate means and the second connecting means being pivotably connected to the lower connecting means on the front fork, upper swing arm means having forward and rearward ends thereof, and shorter than the lower swing arm means, the forward ends thereof being pivotably connected to the top connecting points on the hub plate means and the rearward ends thereof being pivotably connected to the upper connecting means on the front fork, shock absorber means having two ends and fixedly supported at one end thereof, and stabilizer tube means having upper and lower ends and pivotably connected to the hub plate means at the lower end and the other end of the shock absorber means at the upper end.

4. A front suspension for a bicycle having a front fork adapted to be connected to a bicycle frame and having upper and lower connecting means near a lower end thereof, hub plate means having wheel connection means for having a hub of a front wheel rotatably affixed thereto, the hub plate means having top and bottom connecting points with the top connecting points above the wheel connection means and the bottom connecting points below the wheel connection means, lower swing arm means having forward and rearward ends thereof, the forward ends thereof having a first connecting means and the rearward ends thereof having a second connecting means, the first connecting means being pivotably connected to the bottom connecting points on the hub plate means and the second connecting means being pivotably connected to the lower connecting means on the front fork, upper swing arm means having forward and rearward ends thereof, the forward ends thereof being pivotably connected to the top connecting points on the hub plate means and the rearward ends thereof being pivotably connected to the upper connecting means on the front fork, shock absorber means having two ends and fixedly supported at one end thereof, stabilizer tube means having upper and lower ends and pivotably connected to the hub plate means at the lower end and the other end of the shock absorber means at the upper end, and wherein the relative lengths of the upper and lower swing arms, the relative distances between the wheel connection means and the top and bottom connecting points, and the relative distance between the upper and lower connecting means are such that a force applied to the front wheel below the wheel connection means causes the hub of the wheel to move up and back along a path defined by the rotation of the upper and lower swing arms around the upper and lower connecting means on the front fork.

5. The front suspension of claim 4 wherein the wheel connection means is positioned above an average of the upper and lower connecting means on the front fork.

6. The front suspension of claim 4 wherein the front suspension has travel and the relative lengths of the upper and lower swing arms, the relative distances between the wheel connection means and the top and bottom connecting points, and the relative distance between the upper and lower connecting means are such that substantially constant trail is maintained throughout the travel of the front suspension.

7. A front suspension for a bicycle wherein the front suspension has travel and comprises
- a front fork adapted to be connected to a bicycle frame and having upper and lower connecting means near a lower end thereof,
- hub plate means having wheel connection means for having a hub of a front wheel rotatably affixed thereto, the hub plate means having top and bottom connecting points with the top connecting points above the wheel connection means and the bottom connecting points below the wheel connection means,
- lower swing arm means having forward and rearward ends thereof, the forward ends thereof having a first connecting means and the rearward ends thereof having a second connecting means, the first connecting means being pivotably connected to the bottom connecting points on the hub plate means and the second connecting means being pivotably connected to the lower connecting means on the front fork,
- upper swing arm means having forward and rearward ends thereof, the forward ends thereof being pivotably connected to the top connecting points on the hub plate means and the rearward ends thereof being pivotably connected to the upper connecting means on the front fork,
- shock absorber means having two ends and fixedly supported at one end thereof,
- stabilizer tube means having upper and lower ends and pivotably connected to the hub plate means at the lower end and the other end of the shock absorber means at the upper end, and
- wherein the relative lengths of the upper and lower swing arms, the relative distances between the wheel connection means and the top and bottom connecting points, and the relative distance between the upper and lower connecting means are such that substantially constant trail is maintained throughout the travel of the front suspension.

* * * * *